(12) United States Patent
Tv

(10) Patent No.: US 11,810,547 B2
(45) Date of Patent: Nov. 7, 2023

(54) MACHINE LEARNING FOR INTELLIGENT DICTATION OF ANALYSIS OF MULTIDIMENSIONAL OBJECTS

(71) Applicant: SAP SE, Walldorf (DE)

(72) Inventor: Ramalingam Tv, Calgary (CA)

(73) Assignee: SAP SE, Walldorf (DE)

( * ) Notice: Subject to any disclaimer, the term of this patent is extended or adjusted under 35 U.S.C. 154(b) by 309 days.

(21) Appl. No.: 17/225,550

(22) Filed: Apr. 8, 2021

(65) Prior Publication Data

US 2022/0328034 A1 Oct. 13, 2022

(51) Int. Cl.
| | | |
|---|---|---|
| G10L 13/08 | (2013.01) | |
| G06F 16/28 | (2019.01) | |
| G06N 20/00 | (2019.01) | |
| G10L 13/047 | (2013.01) | |
| G06F 40/30 | (2020.01) | |
| G06F 40/242 | (2020.01) | |
| G06N 5/04 | (2023.01) | |

(52) U.S. Cl.
CPC ............ *G10L 13/08* (2013.01); *G06F 16/283* (2019.01); *G06F 40/242* (2020.01); *G06F 40/30* (2020.01); *G06N 5/04* (2013.01); *G06N 20/00* (2019.01); *G10L 13/047* (2013.01)

(58) Field of Classification Search
CPC ....... G10L 13/00; G10L 13/08; G10L 13/047; G06N 5/00; G06N 5/04; G06N 20/00; G06F 16/00; G06F 16/283; G06F 40/00; G06F 40/30; G06F 40/242
See application file for complete search history.

(56) References Cited

U.S. PATENT DOCUMENTS

| | | | |
|---|---|---|---|
| 2010/0131457 A1* | 5/2010 | Heimendinger | G06F 16/283 707/602 |
| 2010/0256972 A1* | 10/2010 | Grenier | G06F 40/58 704/E15.001 |
| 2011/0246415 A1* | 10/2011 | Li | G06F 16/254 707/602 |
| 2016/0103903 A1* | 4/2016 | Vivalda | H04L 65/403 709/204 |
| 2016/0253403 A1* | 9/2016 | Marin | G06F 16/289 707/605 |
| 2018/0314689 A1* | 11/2018 | Wang | G10L 15/1822 |
| 2020/0192913 A1* | 6/2020 | Tv | G06Q 10/06393 |
| 2022/0067038 A1* | 3/2022 | Ponnamperuma Arachchi | G06F 16/243 |

* cited by examiner

*Primary Examiner* — Daniel C Washburn
*Assistant Examiner* — Sean E Serraguard
(74) *Attorney, Agent, or Firm* — SCHWEGMAN LUNDBERG & WOESSNER, P.A.

(57) ABSTRACT

In an example embodiment, machine learning is utilized to automatically present and explain analysis of multidimensional objects categorized based on context in an enterprise data warehouse. The system is capable of handling dependencies to provide clear insights demonstrated in a native language of an end user. The system is multilingual and capable of framing explanations based on natural language processing (NLP), artificial intelligence (AI), and machine learning. It converts the textual predictions into speech synthesis in the user-understandable native format and then dictates the analysis using the speech synthesis.

20 Claims, 8 Drawing Sheets

MACHINE LEARNING FOR INTELLIGENT DICTATION OF ANALYSIS OF MULTIDIMENSIONAL OBJECTS

TECHNICAL FIELD

This document generally relates to machine learning. More specifically, this document relates to machine learning for intelligent dictation of analysis of multidimensional objects.

BACKGROUND

Multidimensional objects (MDOs) are, as their name suggests, data structures that may be used to store data having multiple dimensions. Commonly, enterprise data warehouses (EDWs) use MDOs to store business data, as doing so makes it easier and faster to retrieve information and generate reports (as opposed to, for example, using relational objects, which provide more efficient storage for data with respect to database size but may be more difficult and/or slower to retrieve information and generate reports from).

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
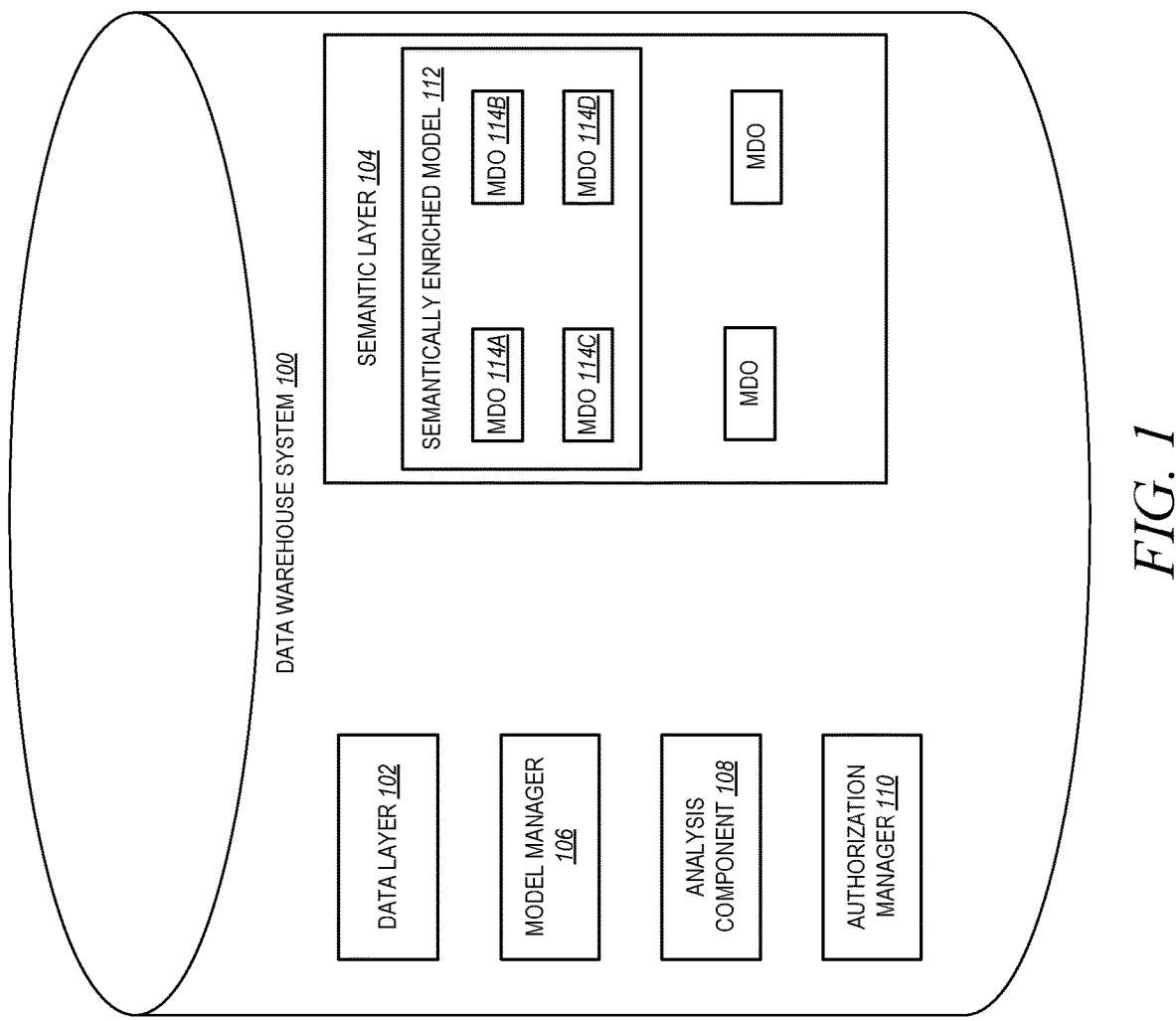
FIG. 1 is a block diagram illustrating a data warehouse system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

The dimensions of the MDOs are typically attributes of the data and the values within those dimensions represent measures of the data for those attributes. For example, if an MDO is used to store information about products, dimensions may include product ID, product size, product cost, product location, and so forth, and then values within each of those dimensions may provide the corresponding measures for the attributes, for the particular products being stored.

Generally MDOs are created in EDWs by having a user create a model. The model then provides unique names and a description for the MDOs used. One issue, however, is that it is difficult to determine what exactly is in an MDO from its description, as it usually refers to the unique names for objects created by the same user who wrote the description, which may not have any meaning to other users. To further complicate things, a single system may contain thousands of models, some of which are related and some of which are not. This makes it difficult for a user to analyze data in MDOs that are contained across multiple models. For example, a user may wish to analyze data from all sales models, but it may be difficult for the user or the system to identify which models are related to sales and which are related to other contexts, as the MDOs referenced have all been created in a non-uniform manner by multiple users who may have named and described similar things differently.

In an example embodiment, machine learning is utilized to automatically present and explain analysis of multidimensional objects categorized based on context in an enterprise data warehouse. The system is capable of handling dependencies to provide clear insights demonstrated in a native language of an end user. The system is multilingual and capable of framing explanations based on natural language processing (NLP), artificial intelligence (AI), and machine learning. It converts the textual predictions into speech synthesis in the user-understandable native format and then dictates the analysis using the speech synthesis.

From a technological standpoint, the system is lightweight and presentations of the analysis can be performed by the system automatically, allowing the system to adapt to questions from the end user, while performing detailed analysis and delivering advanced insights.

A data warehouse can store information and make the information semantically enriched. The data warehouse can make a semantically enriched model available to some or all of the users that can access the data warehouse. In general, a semantically enriched model provides a conceptual data model for the associated data. In some cases, a semantically enriched model can provide descriptions of the associated data. These descriptions can enable the user to understand the meanings of the associated data. In some cases, a semantically enriched model can also provide abstractions of the associated data. For example, an enterprise data warehouse can store data related to business information. These data can include customer numbers and revenue numbers for each individual customer over multiple years. The enterprise data warehouse can also store semantically enriched models associated with these data. For example, a semantically enriched model can describe the nature of these data, e.g., whether the data is a customer number, a year, or a revenue number. Another semantically enriched model can describe an abstraction of the data, e.g., a presentation of the top three customers by revenue in the last three years. Furthermore, a semantically enriched model can include one or more of the following aspects:

Unit or currency conversion. For example, revenue can be stored with different currencies, and accessing the data via the semantic model can convert revenue numbers to a specific currency Data, mathematical or business functions, e.g., maximum, minimum, multiplication, division, trigonometric operations, percentage operations, Boolean logic Display settings such as number of decimal places and result set rendering. For example, negative numbers can be colored in red in a semantically enriched model Inventory or stock coverage measures. For example, a semantically enriched module can include calculations of the stockpile of a product to a given date in the past or the time that the stockpile will reach a predetermined amount in the future Variables. The target currency can be set dynamically for the revenue while accessing the data via the semantic model.

A client can create, modify, or delete the semantically enriched models. A client can represent an application, set of applications, software, software modules, or combination of software and hardware that can be used to interact with the data warehouse. Typically, a client accesses the semantically enriched model in the data warehouse through an interface of the data warehouse.

FIG. 1 is a block diagram illustrating a data warehouse system 100, in accordance with an example embodiment.

The data warehouse system 100 represents any application, set of applications, software, software modules, hardware, or combination of software and hardware that can be used to store data. In some cases, the data warehouse can be an enterprise data warehouse that stores business information. The data warehouse can also store semantically enriched models that are associated with the data.

In the illustrated example, the data warehouse system 100 includes a data layer 102, a semantic layer 104, a model manager 106, an analysis component 108, and an authorization manager 110.

The data layer 102 represents an application, set of applications, software, software modules, hardware, or combination of software and hardware that can be used to store data. In some implementations, the data stored in the data layer 102 can be accessed through a Structured Query Language (SQL) interface.

The semantic layer 104 represents an application, set of applications, software, software modules, hardware, or combination of software and hardware that can be used to create semantically enriched models. The semantic layer 104 can include an interface for a client to create, access, modify, or delete a semantically enriched model. In some cases, the interface is proprietary to the source data warehouse.

The model manager 106 represents an application, set of applications, software, software modules, hardware, or combination of software and hardware that can be used to transform data in the data layer 102 into a semantically enriched model 112 in the semantic layer 104. The semantically enriched model may include and/or reference one or more MDOs 114A-114D. The model manager 106 can also provide data associated with the semantically enriched model 112 to clients of the data warehouse system 100.

The authorization manager 110 represents an application, set of applications, software, software modules, hardware, or combination of software and hardware that can be used to transform security policies associated with a semantically enriched model. In some instances, one or more security policies can be associated with a semantically enriched model. For example, a security policy can include an authorization definition for a user-model pair. The authorization definition can restrict a user's permission to access the data that is associated with the model. In some implementations, the authorization manager 110 can execute a read operation to retrieve a security policy associated with the semantically enriched model from the semantic layer 104.

In an example embodiment, the data warehouse system 100 stores data in the semantic layer 104 in the form of a multidimensional model, such as a star schema. In the center of the star schema is a fact table connected to several dimensions that users can use to slice the data. Each dimension is connected to the fact table via its unique identification. A record in the fact table is uniquely identified by the keys of the dimension tables and becomes a multi-part primary key. Keys of the dimension tables are foreign keys in the fact table.

In an example embodiment, master data is shared across all multidimensional objects in the data warehouse system 100. When modeling is performed, this feature-shared master data plays a role in modeling information objects.

Unlike in a traditional star schema model where dimensions are specific to a fact table, and therefore reference data such as master data and hierarchy is not shared across the multidimensional objects, in an example embodiment, reference data is stored once and shared across all multidimensional objects, which reduces data redundancy.

Facts may contain business measures uniquely associated with a set of predefined dimensions. The number of entries in a fact table can be very large compared to that of individual dimension tables. The size of the fact table depends on the dimension attributes in the dimensions.

Figure 2:
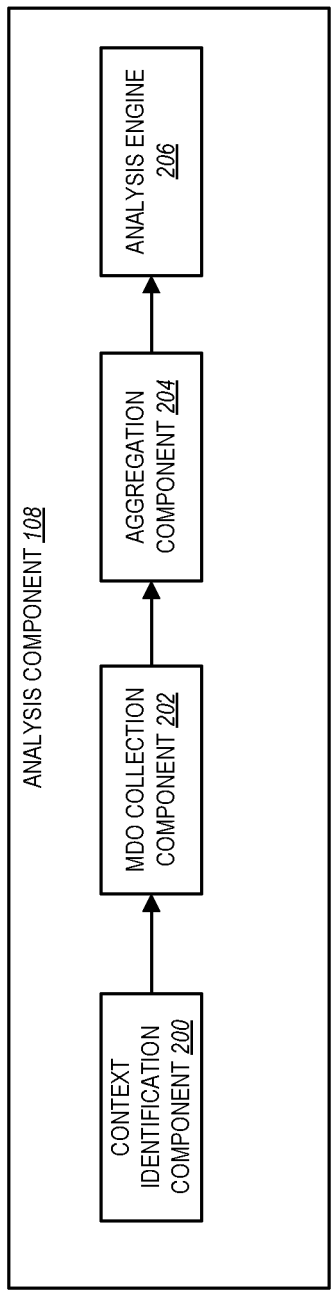
FIG. 2 is a block diagram illustrating an analysis component in more detail, in accordance with an example embodiment.

In an example embodiment, the analysis component 108 may perform automatic analysis of one or more MDOs, such as MDOs 114A-114D, and then dictate the analysis to the user in the user's native language. FIG. 2 is a block diagram illustrating an analysis component 108 in more detail, in accordance with an example embodiment. The analysis component 108 includes a context identification component 200. The context identification component 200 identifies a context of a model selected by a user. The context may be metadata for the MDOs and may be contained in one or more information objects associated with the model. In some examples, the context has a unique context identifier.

An MDO collection component 202 then collects one or more MDOs that have contexts that match the context of the selected model. It should be noted that these MDOs may include both MDOs explicitly referenced by the selected model and MDOs not explicitly referenced by the selected model. For example, if the context of a particular model is "sales," then the MDO collection component 202 may retrieve all MDOs in the semantic layer 104 that match the sales content (e.g., have a context identifier matching the context identifier of the model), regardless of whether the MDOs are actually explicitly referenced by that model.

An aggregation component 204 then aggregates all of the matching retrieved MDOs. This may include creating a single large MDO using the data from the individual matching retrieved MDOs.

An analysis engine 206 then takes the aggregated MDOs and performs automatic analysis of the resultant data set, producing text analysis from the resultant data set. This text analysis is then used by a dictation component 208 to produce speech synthesis for dictation to the user.

Figure 3:
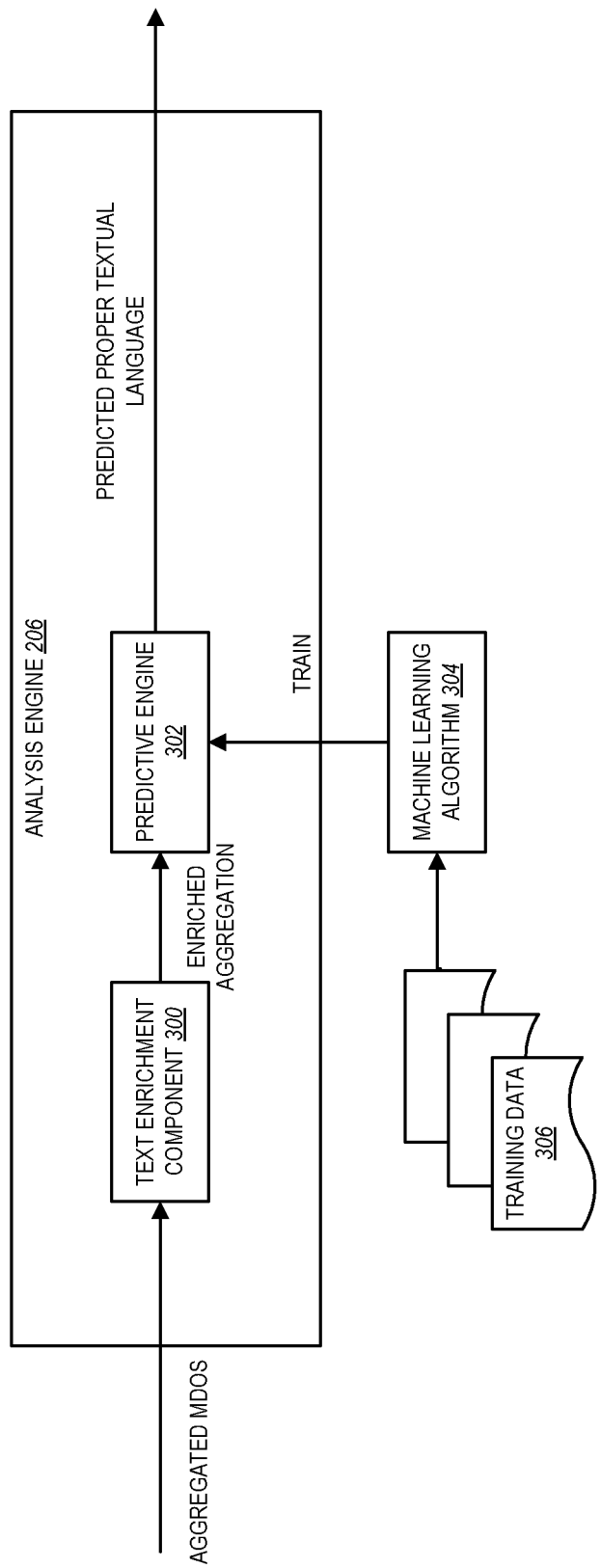
FIG. 3 is a block diagram illustrating an analysis engine in more detail, in accordance with an example embodiment.

FIG. 3 is a block diagram illustrating an analysis engine 206 in more detail, in accordance with an example embodiment. The analysis engine 206 includes a text enrichment component 300, which performs text enrichment on the aggregated MDOs. This enriched aggregation is passed to a predictive engine 302, which uses machine learning to predict proper text-based analysis of the underlying data. Specifically, the predictive engine 302 may be a machine learned model trained using a machine learning algorithm 304 using training data 306. In an example embodiment, the training data 306 may include templates. Each template specifies an example of proper data and language grammar. The machine learning algorithm 304 then uses these example templates to learn weights for various features of input data.

The machine learning algorithm 304 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. The weights may be learned by the machine learning algorithm trying different weights, then examining the results of a loss function applied to a score produced by applying the weights to a particular piece of training data. If the loss function is not satisfied, the machine learning algorithm adjusts the weights and tries again. This is repeated in a number of iterations until the loss function is satisfied, and the weights are learned. When the weights are applied to feature values for a particular piece of input data, such as the enriched aggregated MDOs, it is able to predict proper textual language for the underlying data.

Figure 4:
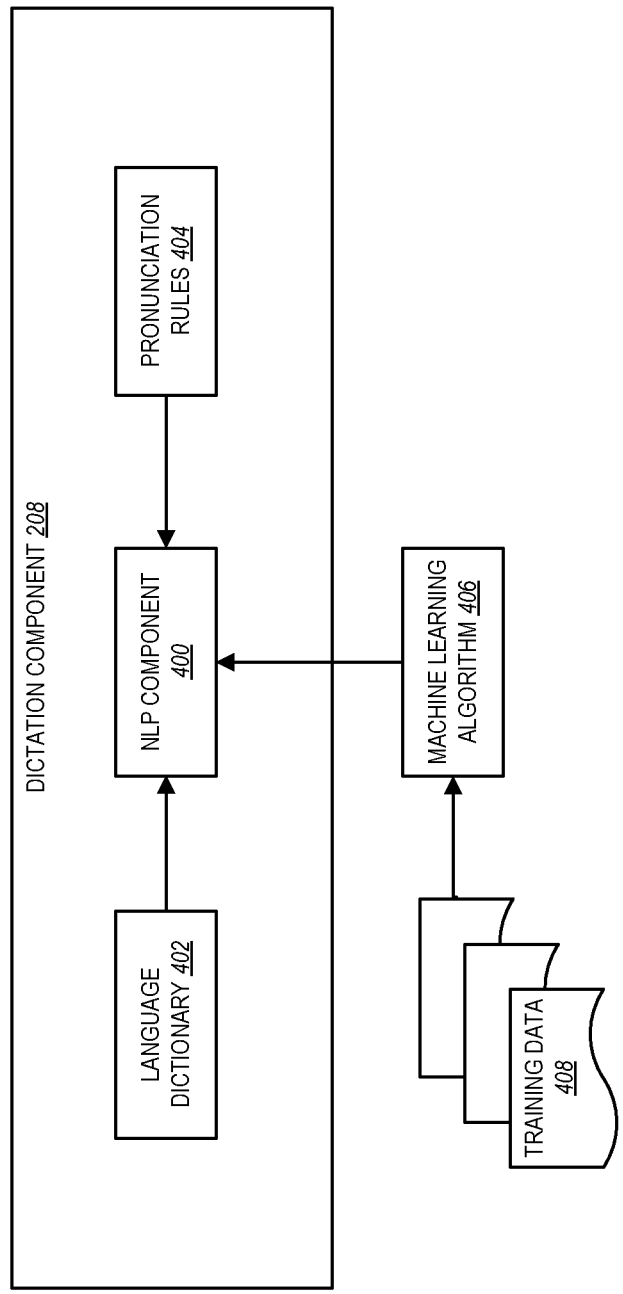
FIG. 4 is a block diagram illustrating a dictation component in more detail, in accordance with an example embodiment.

FIG. 4 is a block diagram illustrating a dictation component 208 in more detail, in accordance with an example embodiment. The dictation component 208 contains an NLP component 400, which uses a language dictionary 402 and pronunciation rules 404 to perform speech synthesis of the predicted proper textual language from the analysis engine 206.

In some example embodiments, the NLP component 400 may itself contain a machine learned model trained using its own machine learning algorithm 406 using training data 408. As with the analysis engine 206, here the machine learning algorithm may also be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. Here the weights learned may be weights applied to features of input text, and may be learned by the machine learning algorithm trying different weights, then examining the results of a loss function applied to a score produced by applying the weights to a particular piece of training data. If the loss function is not satisfied, the machine learning algorithm adjusts the weights and tries again. This is repeated in a number of iterations until the loss function is satisfied, and the weights are learned. When the weights are applied to feature values for a particular piece of input text, it is able to predict proper speech synthesis for the input text, based on the user's native language.

It should be noted that in some example embodiments, the machine learned model in the NLP component 400 may be specific to the enterprise data warehouse in which it is implemented. Indeed, there may even be a different specific machine learned model for each potential context of a model, as the same text may have, for example, different pronunciations in different contexts.

Figure 5:
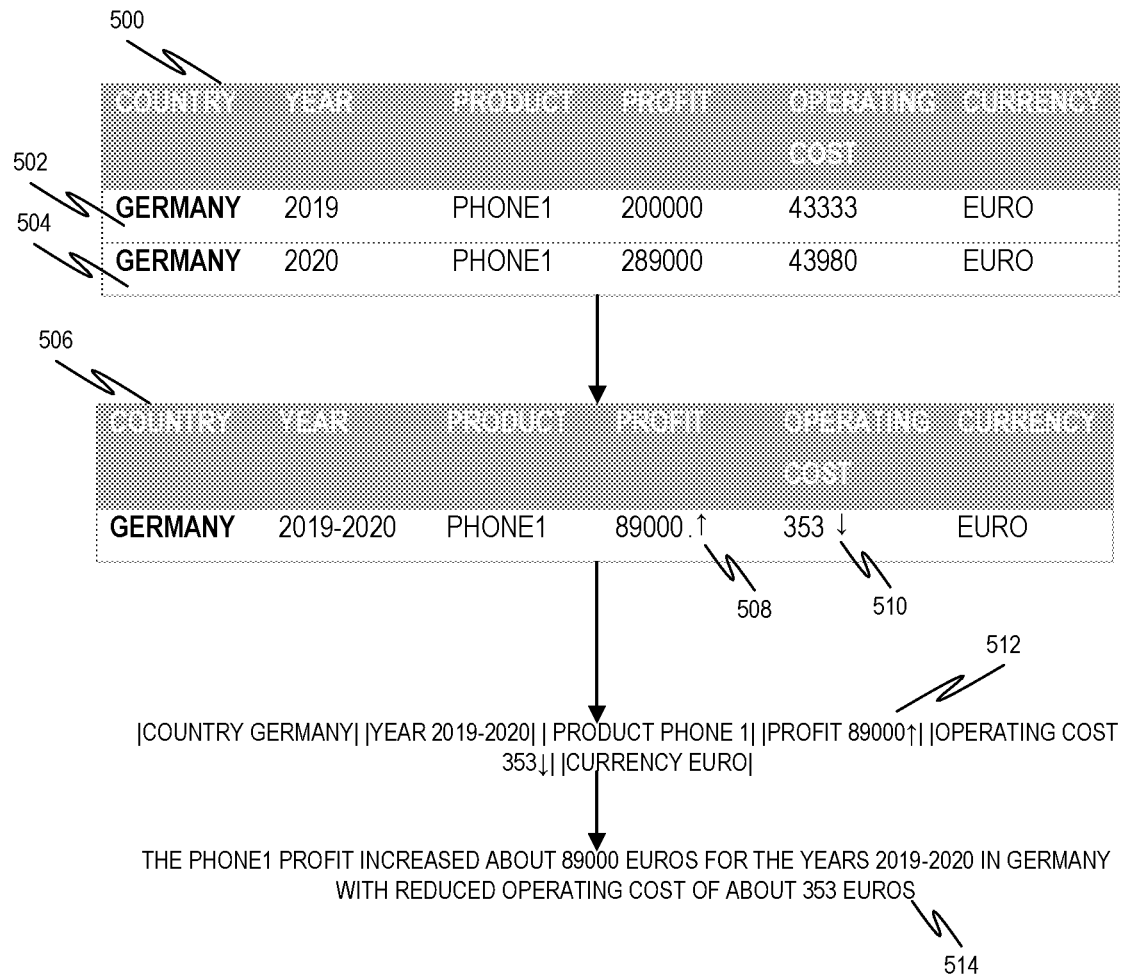
FIG. 5 is a diagram depicting an example of a summarization of multidimensional objects, in accordance with an example embodiment.

Referring back to FIG. 3, the text enrichment component 300 performs a series of actions to enrich the aggregated MDOs. Firstly, the aggregated MDOs may be summarized by, for example, combining rows and adding symbols to the combined rows. For example, two rows describing sales results for different years may be combined, showing the difference in the sales results for the years. FIG. 5 is a diagram depicting an example of such a summarization. Here, aggregated MDOs 500 include a row 502 for 2019 and a row 504 for 2020. Summarized MDOs 506 may combine these rows, introducing symbols such as 508 and 510 to indicate an increase and decrease respectively, from 2019 to 2020.

The text enrichment component 300 may further take these summarized MDOs 506 and create runtime information 512 based on it, by capturing field names and data values as text and numbers, fetching the appended values, and adding pipe symbols between each fieldname and value set.

The predictive engine 302 is trained to read this runtime information 512, append the pipe symbols, and understand the field name and value pairs. It then is able to add verbs, connectors and adjectives, along with grammars, from the user selected language. From this, it can build sentences, including data and language grammars, and output sentence-based descriptions of the data. This is depicted as 514 in FIG. 5.

Figure 6:
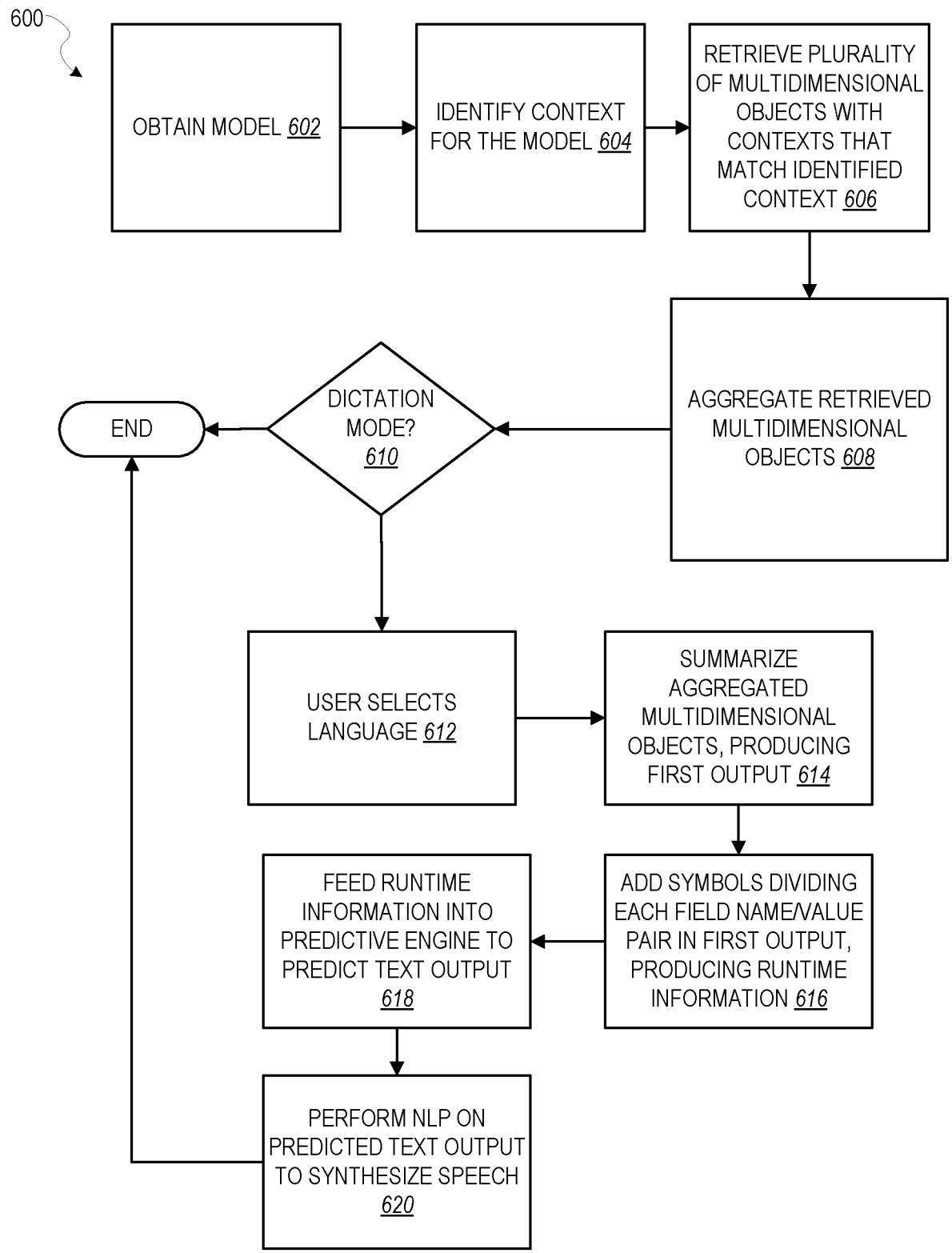
FIG. 6 is a flow diagram illustrating a method for intelligent dictation of multidimensional objects, in accordance with an example embodiment.

FIG. 6 is a flow diagram illustrating a method 600 for intelligent dictation of multidimensional objects in accordance with an example embodiment. At operation 602, a model is obtained. The model identifies one or more multidimensional objects stored in an enterprise data warehouse. This may be obtained, for example, from a user via a graphical user interface presented to the user that allows the user to create a model and/or select a previously presented model. At operation 604, a context for the model is identified. The context may be stored in the model in the form of a context identification as metadata, and thus this identification may involve retrieving this context identification.

At operation 606, a plurality of multidimensional objects with contexts that match the identified context are retrieved from the enterprise data warehouse. At operation 608, the retrieved multidimensional objects are aggregated. This may involve combining the plurality of multidimensional objects into a single multidimensional object. At operation 610, it is determined if a dictate mode has been selected. If not, the method 600 ends. If so, then at operation 612, the user selects a language.

At operation 614, the aggregated multidimensional objects are summarized by combining portions of the aggregated multidimensional objects and adding one or more symbols indicating differences between the combined portions to produce a first output.

At operation 616, a symbol dividing each field name/value pair in the first output is added, producing runtime information. At operation 618, the runtime information is fed to a predictive engine trained by a machine learning algorithm to predict text output for the runtime information. In some example embodiments, the predictive engine is unique to the language.

At operation 620, natural language processing is performed on the predicted text output to synthesize speech for the predicted text output based on a language dictionary and pronunciation rules.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising:
obtaining a model, the model identifying one or more multidimensional objects stored in an enterprise data warehouse;
identifying a context for the model;
retrieving a plurality of multidimensional objects, stored in the enterprise data warehouse, with contexts that match the identified context;
aggregating the retrieved multidimensional objects;
summarizing the aggregated multidimensional objects by combining portions of the aggregated multidimensional objects and adding one or more symbols indicating differences between the combined portions, to produce a first output;
adding a symbol dividing each field name/value pair in the first output, producing runtime information;
feeding the runtime information to a predictive engine trained by a machine learning algorithm to predict text output for the runtime information; and
synthesizing speech for the predicted text output based on a language dictionary and pronunciation rules.

Example 2. The system of Example 1, wherein the operations further comprise:
receiving a language selection from a first user; and
wherein the language dictionary and pronunciation rules are specific to the selected language.

Example 3. The system of Examples 1 or 2, wherein the synthesizing speech includes:
performing natural language processing using a machine learned model trained by a second machine learning algorithm.

Example 4. The system of Example 3, wherein the machine learned model is language-specific.

Example 5. The system of Example 3, wherein the machine learned model is context-specific.

Example 6. The system of any of Examples 1-5, wherein each multidimensional objects contains attributes and measures, with each dimension corresponding to a different attribute.

Example 7. The system of any of Examples 1-6, wherein the model contains a description of each multidimensional object described in the model.

Example 8. A method comprising:
obtaining a model, the model identifying one or more multidimensional objects stored in an enterprise data warehouse;
identifying a context for the model;
retrieving a plurality of multidimensional objects, stored in the enterprise data warehouse, with contexts that match the identified context;
aggregating the retrieved multidimensional objects;
summarizing the aggregated multidimensional objects by combining portions of the aggregated multidimensional objects and adding one or more symbols indicating differences between the combined portions, to produce a first output;
adding a symbol dividing each field name/value pair in the first output, producing runtime information;
feeding the runtime information to a predictive engine trained by a machine learning algorithm to predict text output for the runtime information; and
synthesizing speech for the predicted text output based on a language dictionary and pronunciation rules.

Example 9. The method of Example 8, further comprising:
receiving a language selection from a first user; and
wherein the language dictionary and pronunciation rules are specific to the selected language.

Example 10. The method of Examples 8 or 9, wherein the synthesizing speech includes:
performing natural language processing using a machine learned model trained by a second machine learning algorithm.

Example 11. The method of Example 10, wherein the machine learned model is language-specific.

Example 12. The method of Example 10, wherein the machine learned model is context-specific.

Example 13. The method of any of Examples 8-12, wherein each multidimensional object contains attributes and measures, with each dimension corresponding to a different attribute.

Example 14. The method of any of Examples 8-13, wherein the model contains a description of each multidimensional object described in the model.

Example 15. A non-transitory machine-readable medium storing instructions which, when executed by one or more processors, cause the one or more processors to perform operations comprising:
obtaining a model, the model identifying one or more multidimensional objects stored in an enterprise data warehouse;
identifying a context for the model;
retrieving a plurality of multidimensional objects, stored in the enterprise data warehouse, with contexts that match the identified context;
aggregating the retrieved multidimensional objects;
summarizing the aggregated multidimensional objects by combining portions of the aggregated multidimensional objects and adding one or more symbols indicating differences between the combined portions, to produce a first output;
adding a symbol dividing each field name/value pair in the first output, producing runtime information;
feeding the runtime information to a predictive engine trained by a machine learning algorithm to predict text output for the runtime information; and
synthesizing speech for the predicted text output based on a language dictionary and pronunciation rules.

Example 16. The non-transitory machine-readable medium of Example 15, wherein the operations further comprise:
receiving a language selection from a first user; and
wherein the language dictionary and pronunciation rules are specific to the selected language.

Example 17. The non-transitory machine-readable medium of any of Examples 15-16, wherein the synthesizing speech includes:
performing natural language processing using a machine learned model trained by a second machine learning algorithm.

Example 18. The non-transitory machine-readable medium of Example 17, wherein the machine learned model is language-specific.

Example 19. The non-transitory machine-readable medium of Example 17, wherein the machine learned model is context-specific.

Example 20. The non-transitory machine-readable medium of Examples 15-19, wherein each multidimensional object contains attributes and measures, with each dimension corresponding to a different attribute.

Figure 7:
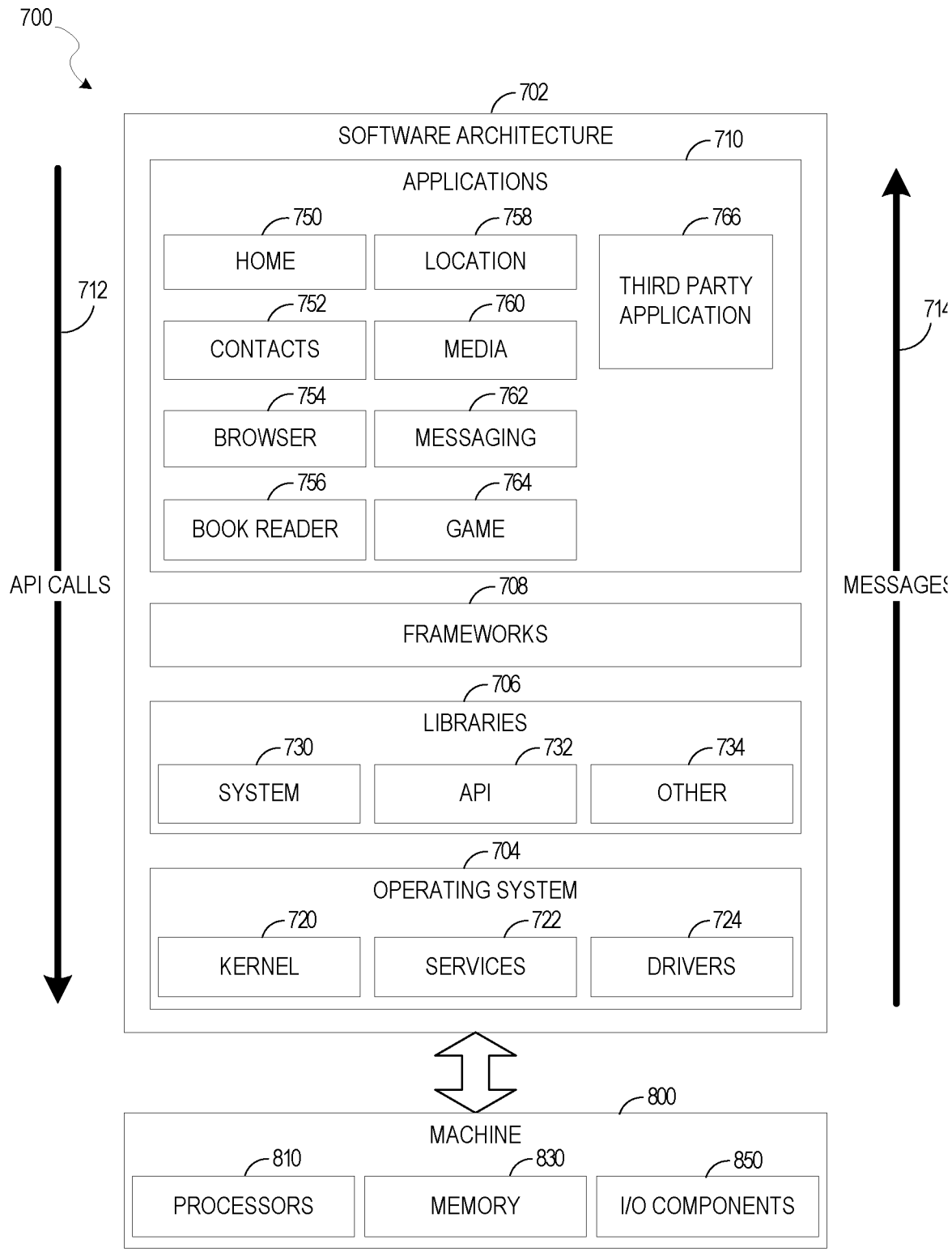
FIG. 7 is a block diagram illustrating an architecture of software, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke Application Program Interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
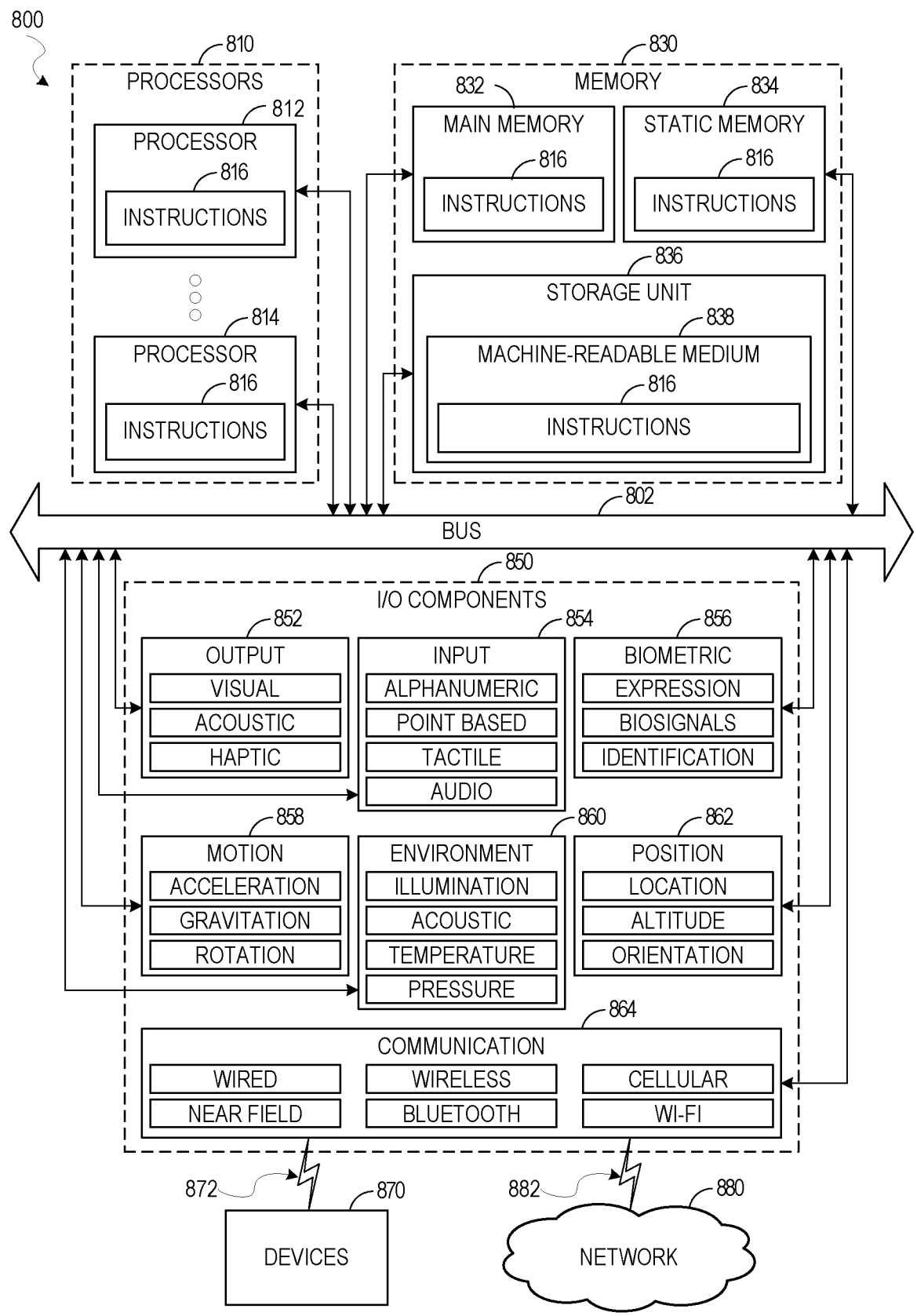
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the methods of FIG. 6. Additionally, or alternatively, the instructions 816 may implement FIGS. 1-6 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   obtaining a model identifying one or more multidimensional objects stored in an enterprise data warehouse, the model having a context identification stored as metadata;
   identifying a context of the model using the context identification;
   retrieving a plurality of multidimensional objects, stored in the enterprise data warehouse, with contexts that match the identified context;
   aggregating the retrieved multidimensional objects;
   combining portions of the aggregated multidimensional objects and adding one or more symbols indicating differences between the combined portions to produce a first output having pairs of field names and values;
   adding a symbol dividing one or more pairs in the first output, producing runtime information;
   feeding the runtime information to a predictive engine trained by a machine learning algorithm to predict text output for the runtime information; and
   synthesizing speech for the predicted text output based on a language dictionary and pronunciation rules.

2. The system of claim 1, wherein the operations further comprise:
   receiving a language selection from a first user; and
   wherein the language dictionary and pronunciation rules are specific to the selected language.

3. The system of claim 1, wherein the synthesizing speech includes:
   performing natural language processing using a machine learned model trained by a second machine learning algorithm.

4. The system of claim 3, wherein the machine learned model is language-specific.

5. The system of claim 3, wherein the machine learned model is context-specific.

6. The system of claim 1, wherein each multidimensional object contains attributes and measures, with each dimension corresponding to a different attribute.

7. The system of claim 1, wherein the model contains a description of each multidimensional object contained in the model.

8. A method comprising:
obtaining a model identifying one or more multidimensional objects stored in an enterprise data warehouse, the model having a context identification stored as metadata;
identifying a context of the model using the context identification;
retrieving a plurality of multidimensional objects, stored in the enterprise data warehouse, with contexts that match the identified context;
aggregating the retrieved multidimensional objects;
combining portions of the aggregated multidimensional objects and adding one or more symbols indicating differences between the combined portions to produce a first output having pairs of field names and values;
adding a symbol dividing one or more pairs in the first output, producing runtime information;
feeding the runtime information to a predictive engine trained by a machine learning algorithm to predict text output for the runtime information; and
synthesizing speech for the predicted text output based on a language dictionary and pronunciation rules.

9. The method of claim 8, further comprising:
receiving a language selection from a first user; and
wherein the language dictionary and pronunciation rules are specific to the selected language.

10. The method of claim 8, wherein the synthesizing speech includes:
performing natural language processing using a machine learned model trained by a second machine learning algorithm.

11. The method of claim 10, wherein the machine learned model is language-specific.

12. The method of claim 10, wherein the machine learned model is context-specific.

13. The method of claim 8, wherein each multidimensional object contains attributes and measures, with each dimension corresponding to a different attribute.

14. The method of claim 8, wherein the model contains a description of each multidimensional object contained in the model.

15. A non-transitory machine-readable medium storing instructions which, when executed by one or more processors, cause the one or more processors to perform operations comprising:
obtaining a model identifying one or more multidimensional objects stored in an enterprise data warehouse, the model having a context identification stored as metadata;
identifying a context of the model using the context identification;
retrieving a plurality of multidimensional objects, stored in the enterprise data warehouse, with contexts that match the identified context;
aggregating the retrieved multidimensional objects;
combining portions of the aggregated multidimensional objects and adding one or more symbols indicating differences between the combined portions to produce a first output having pairs of field names and values;
adding a symbol dividing one or more pairs in the first output, producing runtime information;
feeding the runtime information to a predictive engine trained by a machine learning algorithm to predict text output for the runtime information; and
synthesizing speech for the predicted text output based on a language dictionary and pronunciation rules.

16. The non-transitory machine-readable medium of claim 15, wherein the operations further comprise:
receiving a language selection from a first user; and
wherein the language dictionary and pronunciation rules are specific to the selected language.

17. The non-transitory machine-readable medium of claim 15, wherein the synthesizing speech includes:
performing natural language processing using a machine learned model trained by a second machine learning algorithm.

18. The non-transitory machine-readable medium of claim 17, wherein the machine learned model is language-specific.

19. The non-transitory machine-readable medium of claim 17, wherein the machine learned model is context-specific.

20. The non-transitory machine-readable medium of claim 15, wherein each multidimensional object contains attributes and measures, with each dimension corresponding to a different attribute.

* * * * *